(12) United States Patent
Kang et al.

(10) Patent No.: US 6,542,737 B1
(45) Date of Patent: Apr. 1, 2003

(54) METHOD FOR CHECKING SPEECH CHANNEL OF BASE STATION AND VOCODER OF CONTROL STATION IN MOBILE COMMUNICATION SYSTEM

(75) Inventors: Dae Goo Kang, Kyungki-do (KR); Kye Chol Cho, Kyungki-do (KR); Young Bin Kim, Kyungki-do (KR)

(73) Assignee: Hyundai Electronics Ind. Co., Ltd., Kyungki-Do (KR)

( * ) Notice: Subject to any disclaimer, the term of this patent is extended or adjusted under 35 U.S.C. 154(b) by 385 days.

(21) Appl. No.: 09/650,226

(22) Filed: Aug. 29, 2000

(30) Foreign Application Priority Data

Sep. 2, 1999 (KR) .............................................. 99-37138

(51) Int. Cl.[7] ........................... H04B 17/00; H04Q 7/20
(52) U.S. Cl. ...................... 455/423; 455/67.1; 455/67.4; 455/424; 370/241; 370/252
(58) Field of Search ................................ 455/423, 424, 455/425, 67.1–67.7, 560, 561; 370/241, 241.1, 244, 249, 250, 251, 252, 329

(56) References Cited

U.S. PATENT DOCUMENTS

| | | | | |
|---|---|---|---|---|
| 5,732,353 A | | 3/1998 | Haartsen ...................... | 455/450 |
| 5,757,810 A | * | 5/1998 | Fall ............................. | 714/704 |
| 6,009,332 A | | 12/1999 | Haartsen ...................... | 455/450 |
| 6,038,458 A | | 3/2000 | Siira ........................... | 455/560 |
| 6,405,020 B1 | * | 3/2000 | Oestreich et al. ........... | 455/67.3 |
| 6,456,860 B1 | * | 9/2002 | Nakagaki ..................... | 455/561 |

FOREIGN PATENT DOCUMENTS

| | | | | | |
|---|---|---|---|---|---|
| JP | 356152394 A | * | 11/1981 | ........... | H04Q/11/04 |
| JP | 403267850 A | * | 11/1991 | ............ | H04M/3/26 |
| JP | 411215042 A | * | 8/1999 | ............ | H04B/7/26 |

* cited by examiner

*Primary Examiner*—Duc Nguyen
(74) *Attorney, Agent, or Firm*—Bryan Cave LLP; Lawrence G. Kurland, Esq.

(57) ABSTRACT

There is provided a method for checking a speech channel of a base station and a vocoder of a control station in a mobile communication system, in which its operation station designates specific multiple vocoder of the control station and specific multiple speech channels of the base station to establish a call, to check if the vocoders and speech channels are poor, and when they are confirmed to be poor the operation station does not allow call services through the poor vocoder and speech channel, thereby continuously maintaining high quality call services.

19 Claims, 2 Drawing Sheets

METHOD FOR CHECKING SPEECH CHANNEL OF BASE STATION AND VOCODER OF CONTROL STATION IN MOBILE COMMUNICATION SYSTEM

BACKGROUND OF THE INVENTION

1. Field of the Invention

The present invention relates to a method for checking a speech channel of base stations and a vocoder of a control station in a mobile communication system and, more particularly, to a method for checking vocoders of a control station and speech channels of all service frequencies provided by base stations through functions of general calls and test calls, to thereby check call processing and handoff functions.

2. Description of the Related Art

A mobile communication system is used for radio communications between mobile objects such as people, automobiles, ships and airplanes. The mobile communication system includes a personal communication service (PCS), digital cellular system (DCS) and digital trunked radio system (DTRS). This mobile communication system consists of an operation station 10, a control station 20 and a base station 30, as shown in FIG. 1. The operation station 10 operates and maintains the control station 20 and base station 30 and gathers information, and an operator controls the control station, base station and their subsidiary apparatuses through commands provided by the operation station 10. The control station 20, located between the base station 30 and a switching center (not shown), performs functions of conversion of packet data and PCM data, transmission/reception of converted voice information, supporting handoff, power control and so on using a vocoder (not shown) corresponding to a speech channel when a call is established. Plural base stations 30 are distributed in many areas to provide call service, each consisting of a plurality of devices and channel cards in order to establish and maintain calls to a mobile station (not shown). The channel card consists of a pilot channel, synchronization channel, access channel, paging channel and speech channel according to functions.

Since the plural base stations 30 are distributed in multiple areas, the operation station 10 cannot check if all the base stations can actually provide call services with all of their service frequencies within a short period of time. To check if the vocoder of the control station 20 and all of the speech channels of the base stations are in the normal states, it is required to set calls manually. Further, the number of calls assigned to the vocoder and speech channels and causes of call cancellation can be grasped only through analysis of statistical data.

The mobile station selects a service frequency which can be provided thereto through a hash function with the number of frequencies provided by the base station 30 and phone number thereof. As long as the number of frequencies provided by the base station 30 is not changed, the mobile station sets up a call only with the frequency selected by itself. Thus, call setup is uniformly carried out by frequencies provided by the base station 30. A method of detecting a poor speech channel using a test call of a mobile communication system in order to solve the above-described problems is disclosed in Korea Pat. Appl. No. 98-22764, Jun. 17, 1998, entitled "Method of detecting poor speech channel using test call of mobile communication system".

This method is to set up a test call to the mobile station located in each base station to check if call service is available. Here, the mobile station has access only at its service frequency because its phone number is fixed. Accordingly, this method has a problem that the call service cannot be checked with all the frequencies provided by the base station 30. In addition, in case where the test call is Markov call, the method cannot test handoff function constructed of transmission and reception of messages between the control station and the vocoder, and the base station and its speech channel, and general call processing because handoff is not supported. Moreover, the call test cannot be carried out for specific plural vocoders of the control station 20 and specific multiple speech channels of the base station 30, which are considered as poor channels. Furthermore, the vocoder of the control station 20 cannot be maintained and checked because the call test is performed only for the base station 30.

SUMMARY OF THE INVENTION

It is, therefore, an object of the present invention to provide a method for checking a speech channel of a base station and a vocoder of a control station in a mobile communication system, which checks vocoders of the control station and speech channels of all service frequencies provided by the base stations through functions of general calls and test calls, to thereby check call processing and handoff functions, maintaining high quality call services.

To accomplish the object of the present invention, there is provided a method for checking a speech channel of a base station and a vocoder of a control station in a mobile communication system, the method is characterized in that, when an operation station requests of a mobile station that a call is established with a specific frequency provide by the base station, the base station transmits a call assignment message to the mobile station in idle state to set up a call with a frequency designated by the operation station, and the base station also sends a call setup message to the mobile station or the operation station transmits a message to the mobile station, to thereby support the basic incoming call/outgoing call, incoming/outgoing Markov calls and incoming/outgoing loop back calls. Accordingly, it is possible to check if the mobile station can establish a call with all frequencies provided by the base station without regard to the number of service frequencies of the base station and the phone number of the mobile station.

Furthermore, the method for checking a speech channel of a base station and a vocoder of a control station in a mobile communication system can check the flow of a series of messages related with general incoming/outgoing calls between the base station and control station and between the vocoder and speech channel, and supports handoff in case of the loop back call or general incoming/outgoing calls to enable handoff function test when the mobile station requests handoff.

DETAILED DESCRIPTION OF THE PREFERRED EMBODIMENT

Figure 1:
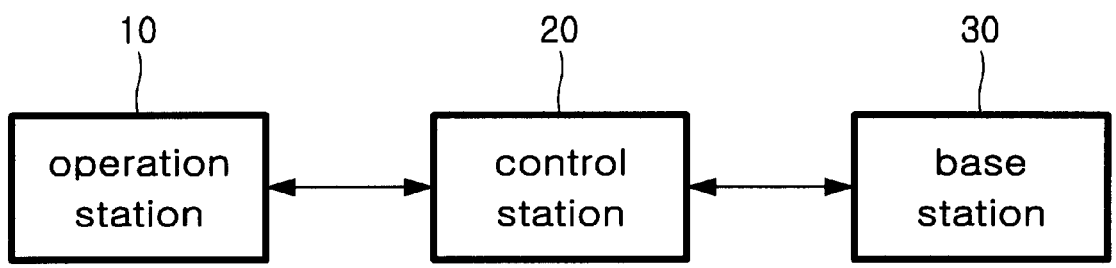
FIG. 1 roughly shows the configuration of a general mobile communication system.

A preferred embodiment of a method for checking a speech channel of a base station and a vocoder of a control station in a mobile communication system according to the present invention is explained below with reference to the attached drawing.

First of all, a method for checking the speech channel of the base station is described below. In case where the operation station selects a base station to be checked to test a call through a speech channel of a specific frequency or speech channels of all frequencies provided by the base station, the operation station sends a message including a string of data items to the base station. Upon reception of the message from the operation station, the base station analyzes the data included therein and, if the call can be established to a mobile station with the current service frequency of the mobile station, sends the message to the mobile station, to set up a call that the operation station wants (Markov incoming/outgoing calls, general incoming/outgoing calls).

However, when the mobile station cannot establish the call with the frequency the operation station wants to use, the base station transmits a channel assignment message to the mobile station to allow it to receive call service at a specific frequency designated by the operation station so that the call can be set up to the mobile with the frequency designated by the operation station. Then, the base station establishes a call that the operation station wants to the mobile station with a frequency designated by the operation station, to thereby check the speech channel of a specific frequency or speech channels of all frequencies provided by the base station. Here, the base station gathers data on causes of call cancellation or frame error rates in the above procedure and reports it to the operation station, to allow the operation station to judge if the speech channel is in the normal state.

In case where the operation station wants to check the vocoder of the control station without regard to the base station, the operation station establishes the incoming loop back call to the mobile station and the control station and base station transmit and receive a message related with the call processing therebetween. Subsequently, the control station sets up the call through a vocoder selected by the operation station, thereby checking a specific vocoders or all vocoders.

When the operation station wants to simultaneously check the speech channel of the base station and the vocoder of the control station, the operation station transmits a message containing data to be tested to the control station. The control station analyzes this data and then sends it to the base station. Upon reception of the message from the control station, the base station does a series of works to set up a call to the mobile station with a frequency designated by the operation station, and then sends the message to the mobile station, thereby establishing the call among the vocoder of the control station, the speech channel of the base station and the mobile station.

After the call setup, with detecting the pilot signal of other sector, the mobile station transmits a handoff request message to the base station. Then, the control station and base station transmits and receives messages therebetween, to perform handoff of the mobile station. The vocoder of the control station periodically transmits the frame error rate to the operation station after the call setup, and sends the average frame error rate, the number of time of call assignment and causes of call cancellation to the control station after the call is cancelled. The control station gathers the data items received and sends them to the operation station. The base station also gathers data items from the speech channel of the base station and transmits them to the operation station. Then, the operation station detects a poor speech channel depending to the data sent thereto. Accordingly, the operation station can designate specific plural vocoders of the control station and specific multiple speech channels of the base station to set up a call, thereby being able to check the vocoder and speech channel to be considered as poor. Further, the vocoder and speech channel are confirmed to be poor, the operation station does not allow call service through the poor vocoder and speech channel, maintaining high-quality call services.

Figure 2:
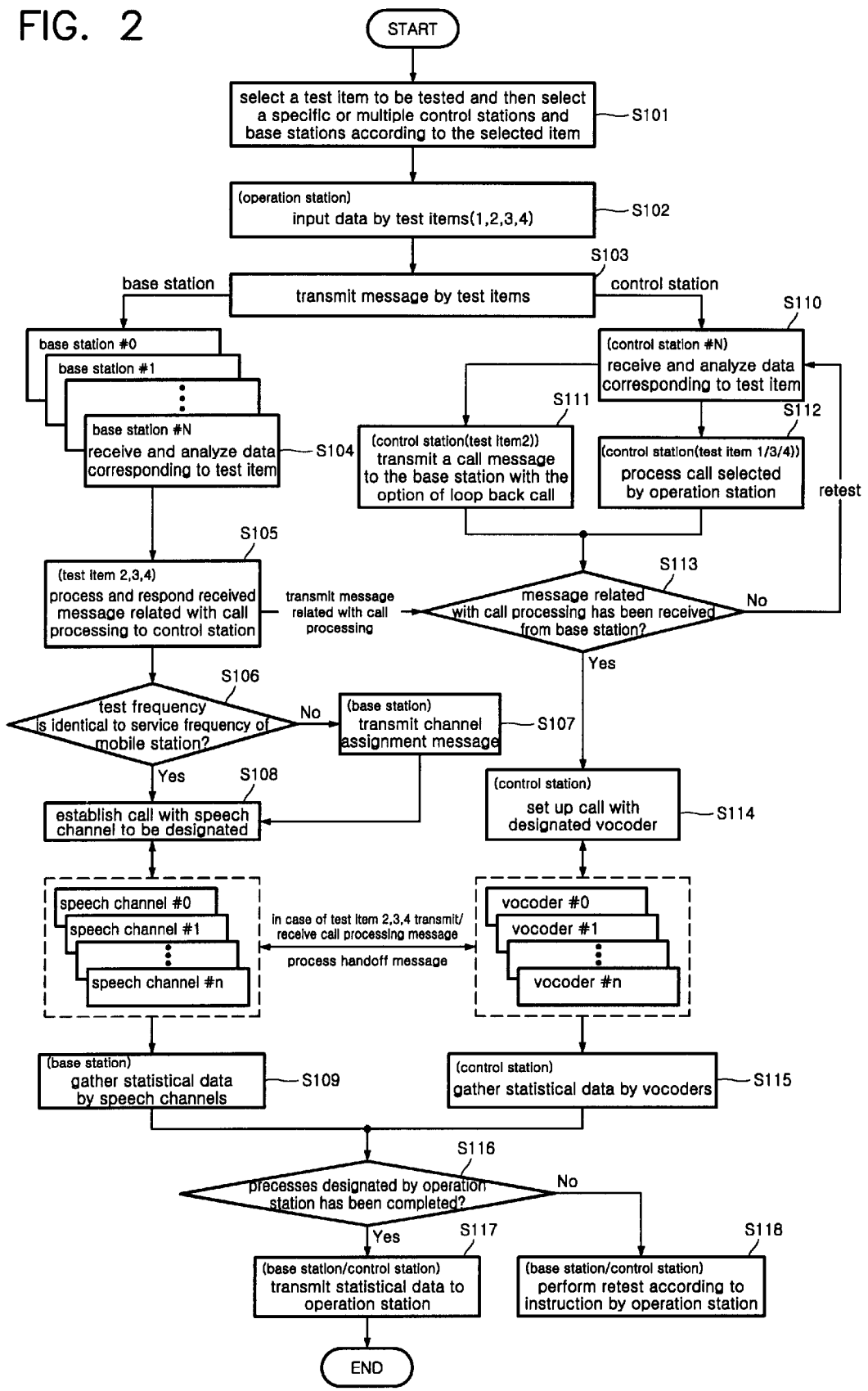
FIG. 2 is a flow chart showing a method for checking a speech channel of a base station and a vocoder of a control station in a mobile communication system according to the present invention.

There is described below the aforementioned method for checking the speech channel of the base station and the vocoder of the control station in a mobile communication system according to the present invention in more detail with reference to FIG. 2. FIG. 2 is a flow chart showing the method for checking the speech channel of the base station and the vocoder of the control station in a mobile communication system according to the present invention.

First of all, the operation station selects an item to be tested, and then selects a specific control station and base station or multiple control stations and base stations according to the selected test item (S101). Here, the test item is classified into a test item 1 for checking only the speech channel of the base station (the speech channel of a specific frequency or speech channels of all frequencies of the base station), a test item 2 for checking only the vocoder of the control station (a specific vocoder or all vocoders of the control station), a test item 3 for checking a specific vocoder of the control station and a specific speech channel of the base station (the vocoder of the control station and the speech channel of a specific frequency or speech channels of all frequencies of the base station), and a test item 4 for checking specific plural vocoders of the control station and plural speech channels of the base station (specific vocoders of the control station and specific speech channels of the base station).

The method of selecting a specific control station and base station or multiple control stations and base stations according to each test item is explained in the following. The operator selects the ID of a specific base station or IDs of multiple base stations when it selects the test item 1, and selects the ID of a specific control station or IDs of multiple control stations in case of the test item 2. The operator selects the ID of a specific base station and control station or IDs of multiple base stations and control stations when it selects the test items 3 and 4. Upon selection of the test item and ID of a base station or control station in accordance with that test item, the operator includes data corresponding to the selected test item to a message (S102).

The data commonly inputted to the message by the operator for all of the test items includes a cell setup maintenance time (service maintenance time for each call) and the number of times of attempting a call (number of times of attempting a call between one speech channel and mobile station). In case of selection of the test item 1, the data includes a base station frequency ID, that is, a specific service frequency or all frequencies provided by the base station, a speech channel ID, that is, the ID of a specific speech channel or the IDs of plural speech channels provided by the base station, the kind of a call (outgoing Markov call/incoming Markov call), and call setup data (outgoing Markov call/incoming Markov call data transmission rate). In case of selection of the test item 2, the data includes a vocoder ID (ID of a specific vocoder or IDs of multiple vocoders of a specific control station), and the kind of a call (fixed to the incoming loop back call). Further, in case of selection of the test items 3 and 4, the data inputted to the message contains the vocoder ID, the kind of a call and the phone number of a called part. Here, the kind of a call corresponds to incoming/outgoing loop back calls and incoming/outgoing general calls, and the phone number of the called part is contained in the message when a general call is originated.

Upon the data corresponding to the test item selected by the operator being included in the message, the operator transmits the message to the base station and control station (S103). The operations of the base station and control station will now be explained separately.

When the operator selects the test item 1 so that the data corresponding to the test item 1 is sent to the base station and control station, the base station analyzes the received data (S104) and transmits a message related with call processing to the control station (S105). Then, the base station judges if a call can be established with the mobile station with a current service frequency of the mobile station. That is, it judges whether the service frequency of the mobile is identical to a test frequency set by the operation station (S106). When the call can be established at the current service frequency of the mobile station, that is, when the frequency set for test and the service frequency of the mobile station are identical to each other, the base station transmits the message to the mobile station, sets up a call over a speech channel designated by the operation station (S108), and then processes a call (which corresponds to incoming/outgoing Markov calls, general incoming/outgoing calls) selected by the operationstation (S112). On the other hand, when the call cannot be established with the current service frequency of the mobile station, that is, when the test frequency is different from the service frequency of the mobile station, the base station transmits a channel assignment message to the mobile station to allow it to be able to establish a call with a specific frequency designated by the operation station (S107), sets up the call over the speech channel designated by the operation station (S108), and then processes the call selected by the operation station, thereby checking the speech channel of a specific frequency or speech channels of all frequencies of the base station. In addition, the base station gathers data on causes of call cancellation by speech channels or frame error rate during the checking of the speech channel of a specific frequency or all frequencies (S109). Further, the base station judges if all processing operation instructed by the operation station has been completed (S116). When the processing operation is not finished yet, the base station performs a retest according to an instruction of the operation station (S118), and when it has been finished the base station reports speech channel statistical data gathered at the step S109 to the operation station to allow it to judge if the speech channel is in normal state.

Meanwhile, in case where the operator selects the test item 2 (for checking the control station's vocoder only), the operator transmits a plurality of data items (call setup maintenance time, the number of times of attempting a call, vocoder ID, the kind of a call) corresponding to the test item 2 to both of the base station and control station (S103). Here, the kind of a call is fixed to the incoming loop back call. The control station and base station receive the data items from the operation station and analyze them (S104 and S110), and the control station transmits a call message to the base station to establish the incoming loop back call (S111) while the base station sends the message related with call processing (S105). Then, the control station judges if the message related with call processing is received from the base station (S113). When the message related with call processing has not been received from the base station, the control station reanalyzes the data in accordance with the test item transmitted from the operation station and repeats the aforementioned procedure. On the other hand, when the message related with call processing has been received from the base station, the control station sets up a call with a vocoder designated by the operation station or all vocoders (S114). Upon the call being established with the vocoder designated by the operation station, the control station gathers data on the number of times of setting up a call through the vocoder and speech channel, causes of call cancellation and the frame error rate of each vocoder by vocoders (S115) to send this gathered statistical data to the operation station (S117). Accordingly, the operation station detects a poor vocoder depending on the received statistical data gathered by vocoders. In the procedure of gathering the statistical data at the step S115, the mobile station may generate a handoff request message. In this case, the vocoder of the control station and the speech channel of the base station transmit and receive a message related to handoff processing therebetween to send a response to the handoff request message to the mobile station.

In case where the operation station selects the test item 3 (for checking the vocoder of the control station and the speech channel of the base station) or the test item 4 (for checking the multiple vocoders of the control station and specific multiple speech channels of the base station), the operation station puts data including a call setup maintenance time, the number of times of attempting a call, a vocoder ID, the kind of a call and, in case of general outgoing call, the phone number of a called part into a message and sends this message to the base station and control station (S103). Upon reception of the message including the data from the operation station, the base station and control station analyze the received data (S104 and S110). The control station processes a call selected by the operation station (S112) while the base station transmits a message related with the call processing to the control station (S105) and, simultaneously, judges if a frequency set for test is identical to the service frequency of the mobile station (S106). When they are identical to each other, the base station sets up the call through a speech channel designated (S108). Meantime, the control station judges if the message in association with the call process has been received from the base station (S113) and, when this message has been received, sets up the call with a vocoder designated by the operation station, thereby setting up the call between the speech channel, vocoder and mobile station.

Upon setting up the call between the speech channel and vocoder, the control station gathers data on the number of times of setting a call of the vocoder and speech channel, causes of call cancellation and the frame error rate of each vocoder by vocoders and sends it to the operation station (S117). Here, while the call is set up between the vocoder and speech channel and the mobile station, the mobile station judges if the pilot signal of other sector is detected. When it is, the mobile station sends a handoff request message to the base station. In response to this, the base station transmits/receives a series of messages to/from the control station to allow the mobile station to carry out handoff.

Consequently, the method for checking the speech channel of the base station and the vocoder of the control station in a mobile communication system according to the present invention supports general incoming/outgoing calls, a loop back call and even Markov call in addition to the conventional function that a specific base station or multiple base stations are selected through the conventional incoming Markov test call to check statistical data and frame error rate for all speech channels. Accordingly, the operation station can inspect everything from the basic call processing procedure to handoff function test, and check the vocoder of the control station and the speech channel of the base station separately or together as distinguished from the conventional method in which only the speech channel of the base station is checked.

As described above, according to the method for checking the speech channel of a base station and the vocoder of a control station in a mobile communication system of the present invention, the operation station can designate specific multiple vocoders of the control station and specific plural speech channels of the base station to set up a call, thereby being able to check a vocoder and speech channel which may be recognized as poor in real time. When they are confirmed to be poor, the operation station does not allow the call to be established with the poor vocoder and on the poor speech channel, resulting in continuous maintenance of high-quality call service.

What is claimed is:

1. A method for checking a speech channel of a base station and a vocoder of a control station in a mobile communication system, the method comprising the steps of:

selecting one of a plurality of test items to be checked, and transmitting the ID of a base station or control station for the selected test item and data corresponding to the selected test item to the base station and the control station;

the base station and the control station receiving and analyzing the data, and setting up a call to a mobile station through a speech channel of the base station and a vocoder of the control signal, the speech channel and vocoder being designated by an operation station, the call to be set up being determined according to the analyzed result;

after the call setup, gathering statistical data on the number of times of setting up a call through the vocoder and speech channel, causes of call cancellation and frame error rate by speech channels and vocoders, and transmitting the statistical data to the operation station; and detecting a poor speech channel and a poor vocoder depending on the statistical data.

2. The method as claimed in claim 1, wherein the plurality of test items includes a test item 1 for checking only the speech channel of the base station, a test item 2 for checking only the vocoder of the control station, and test items 3 and 4 for simultaneously checking the vocoder of the control station and the speech channel of the base station.

3. The method as claimed in claim 2, wherein, when the test item 1 for checking only the speech channel of the base station is selected, the data transmitted to the base station and control station includes a specific service frequency or all service frequency provided by the base station, the ID of a specific speech channel or IDs of multiple speech channels provided by the base station, the kind of outgoing Markov call/incoming Markov call, an outgoing Markov call/incoming Markov call data transmission rate, a period of time for maintaining call setup and the number of times of attempting a call.

4. The method as claimed in claim 2, wherein, when the test item 2 for checking only the vocoder of the control station is selected, the data transmitted to the base station and control station includes a period of time for maintaining call setup, the number of times of attempting a call, the ID of a specific vocoder or IDs of multiple vocoders of a specific control station, and an incoming loop back call.

5. The method as claimed in claim 2, wherein, when the test items 3 and 4 for simultaneously checking the vocoder of the control station and the speech channel of the base station are selected, the data transmitted to the base station and control station includes a period of time for maintaining call setup, the number of times of attempting a call, the ID of a specific vocoder or IDs of multiple vocoders of a specific control station, the incoming/outgoing loop back call, the kind of an incoming/outgoing general call, and the phone number of a called part.

6. The method as claimed in claim 1, wherein, when a test item 1 for checking only the speech channel of the base station is selected, the data transmitted to the base station and control station includes a specific service frequency or all service frequency provided by the base station, the ID of a specific speech channel or IDs of multiple speech channels provided by the base station, the kind of outgoing Markov call/incoming Markov call, an outgoing Markov call/incoming Markov call data transmission rate, a period of time for maintaining call setup and the number of times of attempting a call.

7. The method as claimed in claim 1, wherein, when a test item 2 for checking only the vocoder of the control station is selected, the data transmitted to the base station and control station includes a period of time for maintaining call setup, the number of times of attempting a call, the ID of a specific vocoder or IDs of multiple vocoders of a specific control station, and an incoming loop back call.

8. The method as claimed in claim 1, wherein, when test items 3 and 4 for simultaneously checking the vocoder of the control station and the speech channel of the base station are selected, the data transmitted to the base station and control station includes a period of time for maintaining call setup, the number of times of attempting a call, the ID of a specific vocoder or IDs of multiple vocoders of a specific control station, the incoming/outgoing loop back call, the kind of an incoming/outgoing general call, and the phone number of a called part.

9. A method for checking a speech channel of a base station and a vocoder of a control station in a mobile communication system, the method comprising the steps of:

in the event of selection of a test item for checking only the speech channel of the base station from a plurality of test items, selecting a specific base station or multiple base stations according to the selected test item;

transmitting data on a period of time for maintaining call setup, the number of times of attempting a call, the frequency of the selected base station, the kind of a call and call setup, which correspond to the selected test item, to the base station;

receiving and analyzing the data transmitted to judge if a call can be established with a current service frequency of a mobile station;

when the call can be established with the current service frequency of the mobile station, transmitting a message related with the call processing to the mobile, to thereby set up a call that an operation station wants between the mobile station and the speech channel;

upon establishment of the call, checking the speech channel of a specific frequency or speech channels of all frequency, to report statistical data on the number of times of setting up a call, causes of call cancellation and the frame error rate of each speech channel to the operation station; and detecting a poor speech channel depending on the statistical data.

10. The method as claimed in claim 9, wherein the plurality of test items includes a test item 1 for checking only the speech channel of the base station, a test item 2 for checking only the vocoder of the control station, and test items 3 and 4 for simultaneously checking the vocoder of the control station and the speech channel of the base station.

11. The method as claimed in claim 9, wherein, when the call cannot be established with the current service frequency of the mobile station in the step of judging if the call can be set up at the current service frequency of the mobile station, transmitting a channel assignment message to the mobile station to allow it to be able to establish a call with a specific frequency designated by the operation station, thereby setting up the call at the designated frequency.

12. A method for checking a speech channel of a base station and a vocoder of a control station in a mobile communication system, the method comprising the steps of:

in the event of selection of a test item for checking only the vocoder of the control station from a plurality of test items, selecting a specific control station or multiple control stations according to the selected test item;

transmitting data on a period of time for maintaining call setup, the number of times of attempting a call, the ID of a specific vocoder or IDs of multiple vocoders of the specific control station and an incoming loop back call to the control station;

receiving and analyzing the data, and transmitting the incoming loop back call from the control station to a mobile station;

judging if a message related with call processing has been received from the base station;

when the message related with call processing has been received from the base station, establishing a call through a vocoder designated by an operation station;

gathering statistical data on the number of times of setting up a call through the vocoder and speech channel, causes of call cancellation and the frame error rate of each vocoder by vocoders, and transmitting the statistical data to the operation station; and detecting a poor vocoder from the multiple vocoders depending on the statistical data.

13. The method as claimed in claim 12, wherein the plurality of test items includes a test item 1 for checking only the speech channel of the base station, a test item 2 for checking only the vocoder of the control station, and test items 3 and 4 for checking the vocoder of the control station and the speech channel of the base station, simultaneously.

14. The method as claimed in claim 12, wherein, when a handoff request message is received from the mobile station while the call is set up through the designated vocoder, the control station transmits/receives a message related with handoff processing to/from the base station, to thereby respond to the handoff request message of the mobile station.

15. A method for checking a speech channel of a base station and a vocoder of a control station in a mobile communication system, the method comprising the steps of:

in the event of selection of a test item for simultaneously checking the vocoder of the control station and the speech channel of the base station from a plurality of test items, selecting a specific control station and base station or multiple control stations and base station according to the selected test item;

an operation station transmitting data on a period of time for maintaining call setup, the number of times of attempting a call, the ID of a specific vocoder or IDs of multiple vocoders of a specific control station, the kind of a call and the phone number of a called part to the control station and base station;

the base station and control station receiving and analyzing the data transmitted from the operation station, the control station processing a call selected by the operation station, the base station transmitting a message related with call processing to the control station;

upon reception of the message related with call processing, the control station setting up a call through a vocoder designated by the operation station, the base station judging if a test frequency is identical to a service frequency of a mobile station;

establishing the call through a speech channel designated by the operation station when the test frequency and the service frequency of the mobile station are identical to each other; and gathering statistical data on the number of times of setting up a call through the vocoder and speech channel, causes of call cancellation and the frame error rate of each vocoder, and reporting the statistical data to the operations station.

16. The method as claimed in claim 15, wherein the the plurality of test items includes a test item 1 for checking only the speech channel of the base station, a test item 2 for checking only the vocoder of the control station, and test items 3 and 4 for simultaneously checking the vocoder of the control station and the speech channel of the base station.

17. The method as claimed in claim 15, wherein the kind of the call included in the data according to the selected test item corresponds to an incoming/outgoing loop back call or incoming/outgoing call.

18. The method as claimed in claim 15, wherein, when a handoff request message is received from the mobile station while the call is set up through the designated vocoder, the control station transmits/receives a message related with handoff processing to/from the base station, to thereby respond to the handoff request message of the mobile station.

19. The method as claimed in claim 15, wherein, when the test frequency is not identical to the service frequency of the mobile station, transmitting a channel assignment message to the mobile station to allow it to be able to set up a call with a specific frequency designated by the operation station, and establishing a call with the designated frequency.

* * * * *